(12) United States Patent
Rothrock et al.

(10) Patent No.: US 11,324,165 B2
(45) Date of Patent: May 10, 2022

(54) ZERO TURNING RADIUS MOWER SPRAYER ATTACHMENT

(71) Applicant: DEERE & COMPANY, Moline, IL (US)

(72) Inventors: Justin R. Rothrock, Willow Spring, NC (US); Jason E. Harmon, Lillington, NC (US)

(73) Assignee: DEERE & COMPANY, Moline, IL (US)

( * ) Notice: Subject to any disclaimer, the term of this patent is extended or adjusted under 35 U.S.C. 154(b) by 72 days.

(21) Appl. No.: 16/828,538

(22) Filed: Mar. 24, 2020

(65) Prior Publication Data
US 2021/0298236 A1   Sep. 30, 2021

(51) Int. Cl.
*A01D 43/14*   (2006.01)

(52) U.S. Cl.
CPC .................................. *A01D 43/14* (2013.01)

(58) Field of Classification Search
CPC ....................................................... A01D 43/14
See application file for complete search history.

(56) References Cited

U.S. PATENT DOCUMENTS

| | | | |
|---|---|---|---|
| 3,301,487 A | 1/1967 | Young | |
| 4,269,356 A * | 5/1981 | Rose | A01M 7/0039 239/167 |
| 4,602,742 A * | 7/1986 | Penson | A01M 7/006 239/172 |
| 4,669,662 A * | 6/1987 | Bruce | A01M 7/0089 239/126 |
| 4,725,004 A * | 2/1988 | Baran, Jr. | A01M 7/0042 239/159 |
| 4,821,959 A | 4/1989 | Browning | |
| 4,828,177 A * | 5/1989 | Schuitemaker | A01M 7/0035 239/165 |
| 4,913,345 A * | 4/1990 | Setter | A01M 7/0042 239/127 |
| 5,190,218 A * | 3/1993 | Kayser | A01M 7/0042 239/142 |
| 5,299,767 A * | 4/1994 | Simpson | B05B 15/00 239/175 |

(Continued)

FOREIGN PATENT DOCUMENTS

AU    2008100505 B4    8/2008

OTHER PUBLICATIONS

Fab Works OEM, Front Mount Zero Turn Mower Attachments, pp. 1-2 [online], [retrieved on Mar. 11, 2020]. Retrieved from the Internet <URL: http://www.fabworksoem.com/fmztma.php>.

(Continued)

*Primary Examiner* — Abigail A Risic

(57) ABSTRACT

A zero turning radius ("ZTR") mower sprayer attachment behind a rear engine of a zero turning radius mower. The sprayer attachment may include a frame supporting a tank on a platform, and a hose from the tank to a plurality of nozzles mounted on a folding boom that is extendable outwardly from the sprayer attachment frame. A lower support bar on a lower forward end of the sprayer attachment frame may be supported by a pair of rearwardly facing hooks on a pair of side brackets on the ZTR mower. An upper tube extends laterally between the pair of side brackets and is engaged by a hook shaped latch on the sprayer attachment frame.

10 Claims, 3 Drawing Sheets

(56) References Cited

U.S. PATENT DOCUMENTS

| | | | | |
|---|---|---|---|---|
| 5,533,676 | A | * | 7/1996 | Conley ................... A01D 43/14 239/168 |
| 6,138,770 | A | * | 10/2000 | Kayser ................... A01B 59/06 172/272 |
| 6,502,771 | B1 | * | 1/2003 | Wyne ................... A01C 17/001 224/514 |
| 7,007,446 | B2 | | 3/2006 | Dettmann |
| 7,043,890 | B2 | * | 5/2006 | Lofton ................... A01D 43/14 56/16.8 |
| 7,124,521 | B1 | * | 10/2006 | Medoro ................... E01H 4/023 37/227 |
| 7,152,812 | B1 | * | 12/2006 | Johnson ............. A01M 7/0039 239/164 |
| 7,413,132 | B1 | * | 8/2008 | Bogart ................ A01M 7/0053 239/163 |
| 7,448,691 | B2 | | 11/2008 | Brooks |
| 8,419,061 | B2 | * | 4/2013 | Fukunaga ............. B60R 21/131 280/756 |
| 10,602,658 | B1 | * | 3/2020 | Najpauer ............ A01M 7/0089 |
| 10,791,674 | B2 | * | 10/2020 | Roberts ................... B05B 15/68 |

OTHER PUBLICATIONS

John Deere, Zero Turn Sprayer John Deere, pp. 1-5 [online], [retrieved on Mar. 11, 2020]. Retrieved from the Internet <URL: https://www.tideindustries.com/ZeroTurnSprayer-JohnDeere. html>.

* cited by examiner

ZERO TURNING RADIUS MOWER SPRAYER ATTACHMENT

FIELD OF THE INVENTION

This invention relates to mowing machines for cutting grass and other vegetation, and more specifically to a sprayer attachment on a zero turning radius ("ZTR") mower.

BACKGROUND OF THE INVENTION

Zero turning radius ("ZTR") mowers have at least one independently powered drive wheel on each side of a frame. Hydrostatic transmissions transmit power to each of the left and right drive wheels, either in forward or reverse. The pair of hydrostatic transmissions, or dual hydrostatic transmission, may be driven by an internal combustion engine. The independent drive wheels allow the ZTR mower to turn on a vertical turning axis. The vertical turning axis may be centrally located between the pair of hydrostatic transmissions. A mower deck may be suspended between the front and rear wheels. A seated operator may use left and right control levers or other steering controls to control the pair of hydrostatic transmission driving the left and right rear drive wheels at ground speeds as fast as 7 mph-8 mph or more while mowing.

For high productivity, property owners and landscapers may seek to use a ZTR mower for other work. For example, some operators have used their ZTR mower for spraying herbicide or insecticide by mounting a sprayer attachment onto the front of the ZTR mower above the mower deck. However, this can result in a problem of spray getting on the operator. There is a need for a sprayer attachment on a ZTR mower behind the rear engine. There is a need for a rear mounted sprayer attachment on a ZTR mower that may be quickly and easily mounted or removed from the ZTR mower and stored.

SUMMARY OF THE INVENTION

A zero turning radius mower sprayer attachment may be mounted to a pair of side brackets extending behind a rear mounted engine on a zero turning radius mower. The same side brackets may interchangeably support a material collection system or the sprayer attachment. The sprayer attachment may include a lower support bar that engages a pair of rear facing hooks on the side brackets, and a latch engaging an upper tube between the pair of side brackets. The lower support bar may pivot on the rear facing hooks to move the latch into or out from engagement position with the upper tube.

DESCRIPTION OF THE PREFERRED EMBODIMENT

Figure 1:
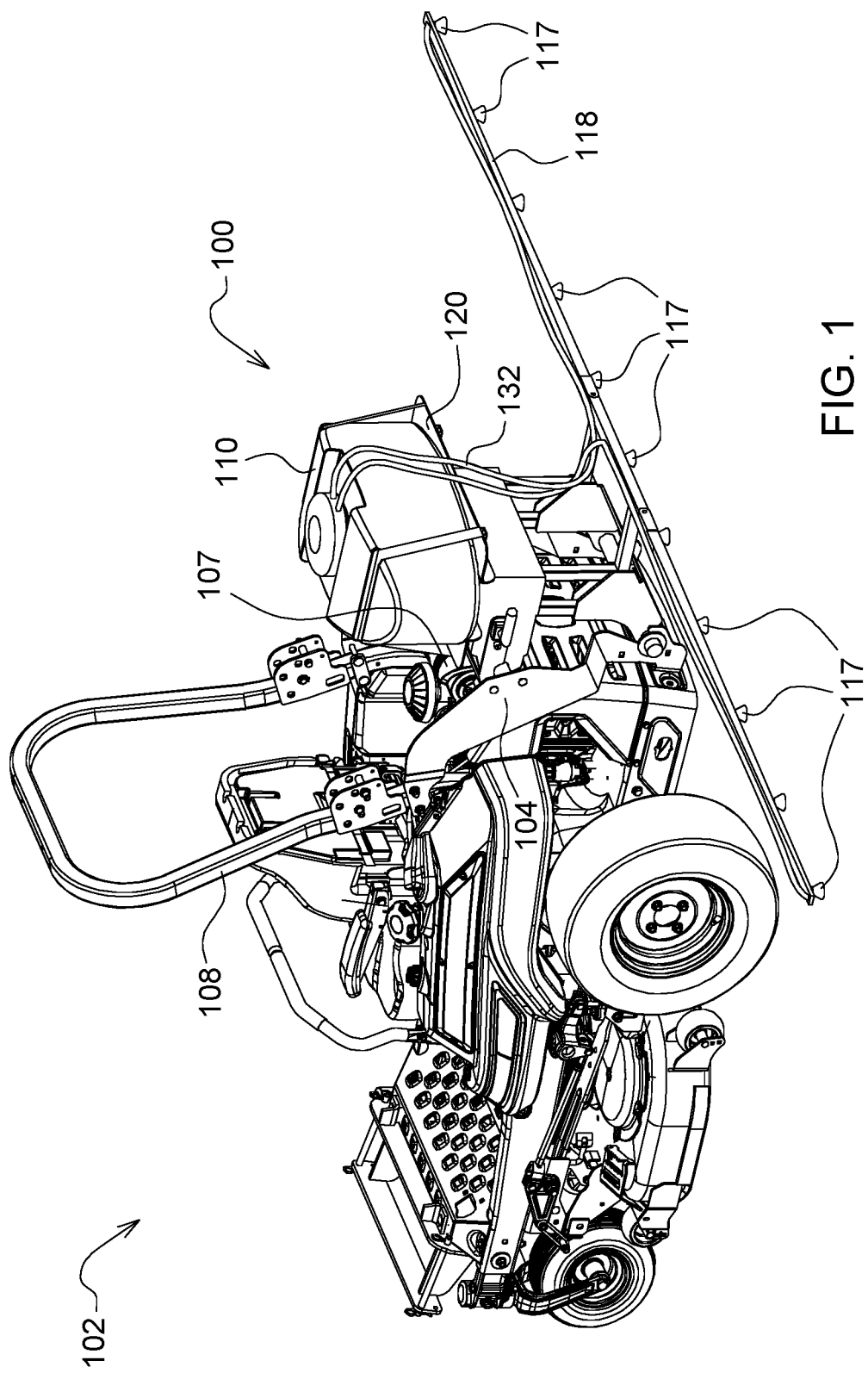
FIG. 1 is a rear perspective view of a zero turning radius mower with a sprayer attachment according to a first embodiment.
Figure 2:
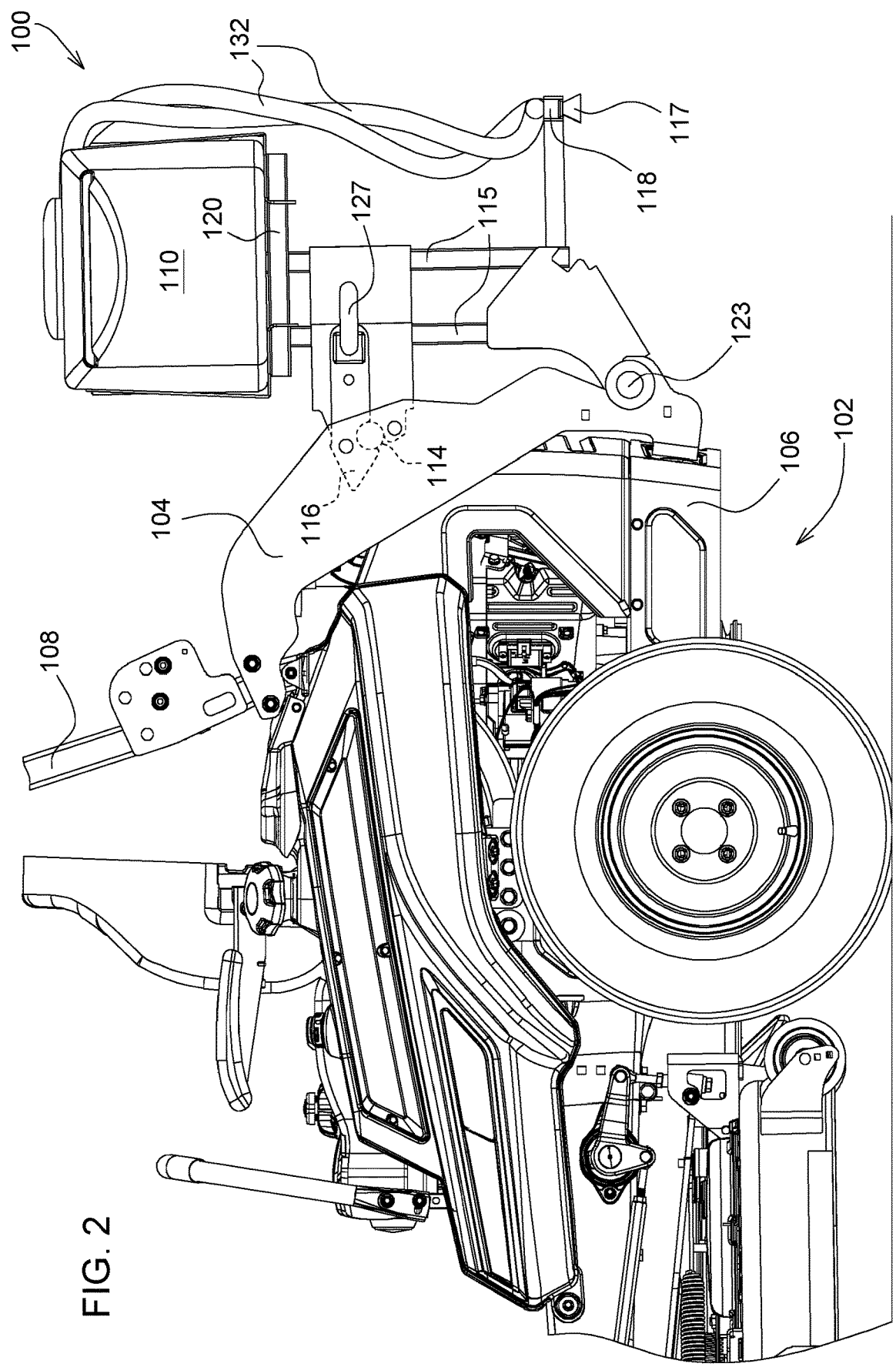
FIG. 2 is a side view of a zero turning radius mower sprayer attachment according to a first embodiment.
Figure 3:
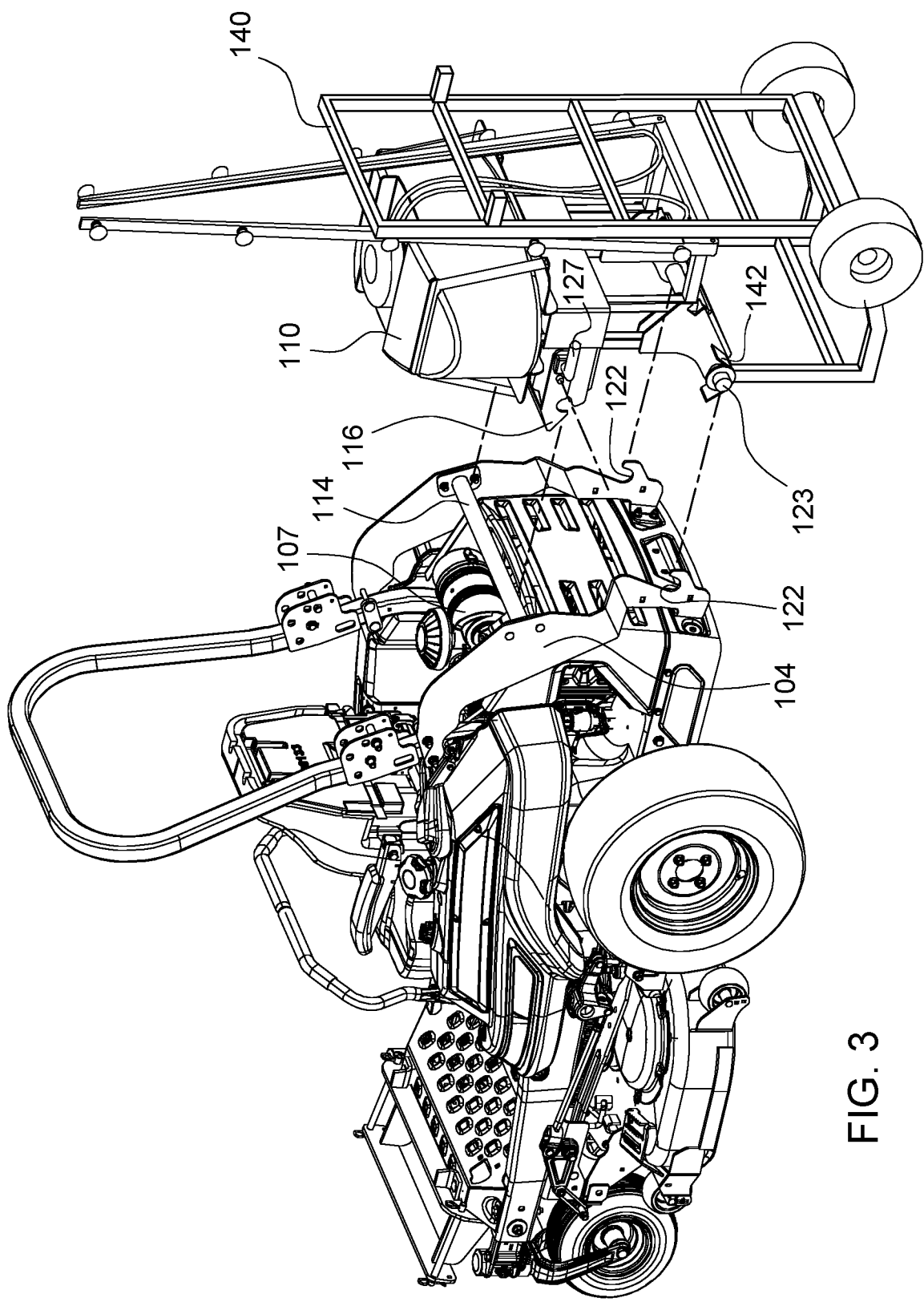
FIG. 3 is a perspective view of a sprayer attachment removed from a zero turning radius mower for storage according to a first embodiment.

FIGS. 1-3 show a first embodiment of zero turning radius ("ZTR") mower sprayer attachment 100. The ZTR mower sprayer attachment may be installed on the rear of ZTR mower 102 behind rear engine 107 in place of, or interchangeably with, a material collection system ("MCS") which must be removed before installing the sprayer attachment. The ZTR mower sprayer attachment also may mounted on hand cart 140 by a single person upon removal from the ZTR mower and moved to storage.

In one embodiment, ZTR mower sprayer attachment 100 may be mounted to side brackets 104 on the rear of a ZTR mower. The side brackets may be the same brackets used for mounting an MCS on the rear of the ZTR mower. Each side bracket may be a metal plate attached to the roll over protection system ("ROPS") behind the operator seat and extending rearwardly and downwardly along one side of rear engine 107. For example, the top or upper end of each side bracket 104 may be fastened and secured to an upright leg of ROPS 108 with a plate and pair of bolts. The bottom or lower end of each side bracket 104 may be fastened and secured to rear guard 106 or a similar frame member behind the rear engine. Upper tube 114 may extend laterally between the upper ends of the side brackets and may be attached and secured to the side brackets with bolts. Each side bracket also may have a rearwardly facing hook 122 adjacent the bottom or lower end of the side bracket.

In one embodiment, ZTR mower sprayer attachment 100 may include tank 110 having a capacity such as 25 gallons, hoses 132 connecting the tank to a plurality of nozzles 117, and foldable spray boom 118 where the nozzles are mounted. The ZTR mower sprayer attachment also may include tank platform 120 under the tank, sprayer attachment frame 115 supporting the tank platform, lower support bar 123 extending laterally across the sprayer attachment frame to pivotably support the frame on side brackets 104, one or more latches 116 that may engage and be secured to upper tube 114, and one or more L-pins 127 to lock the latches in engagement.

In one embodiment, an operator may install ZTR mower sprayer attachment 100 by positioning the sprayer attachment behind the ZTR mower, and lifting the sprayer attachment so that lower support bar 123 can slide onto rearwardly facing hooks 122 in side brackets 104. The rearwardly facing hooks may support sprayer attachment frame 115. The operator then may tilt or pivot the sprayer attachment frame on the lower support bar axis, pushing the sprayer attachment frame forward and securing one or more hook-shaped latches 116 around upper tube 114, and moving each L-pin 127 fully inward to lock the latches in place.

In one embodiment, an operator may remove the ZTR mower sprayer attachment by pulling each L-pin 127 outward, then rotating the top of sprayer attachment frame 115 rearward to release each hook-shaped latch 116 from upper tube 114. The operator then may lift the sprayer attachment frame up and slide lower support bar 123 up from rear facing hooks 122 on the side brackets. The operator may tilt or pivot the sprayer attachment down to the ground or, as shown in FIG. 3, position the sprayer attachment on hand cart 140 having a pair of U-shaped supports 142. Lower support bar 123 may rest on the pair of U-shaped supports 142 to support the sprayer attachment for handling and storage by a single person.

Having described the preferred embodiment, it will become apparent that various modifications can be made without departing from the scope of the invention as defined in the accompanying claims.

The invention claimed is:

1. A zero turning radius mower sprayer attachment, comprising:

a sprayer attachment frame supporting a tank on a platform;

a hose from the tank to a plurality of nozzles mounted on a folding boom that is extendable outwardly from the sprayer attachment frame;

a lower support bar on a lower forward end of the sprayer attachment frame supported by a pair of rearwardly facing hooks on a pair of side brackets mounted to a pair of upright legs of a roll over protection system in front of a rear engine of a zero turning radius mower and extending rearwardly and downwardly along each side of the rear engine; and an upper tube extending laterally between the pair of side brackets and engaged by a hook shaped latch on the sprayer attachment frame.

2. The zero turning radius mower sprayer attachment of claim 1 further comprising a hand cart with a pair of U-shaped supports supporting the lower support bar when the sprayer attachment is removed from the zero turning radius mower.

3. The zero turning radius mower sprayer attachment of claim 1 further comprising a pair of L-pins locking the hook shaped latch around the upper tube.

4. A zero turning radius mower sprayer attachment, comprising:

a pair of side brackets attached to a pair of roll over protection system uprights in front of and extending behind a rear mounted engine on a zero turning radius mower to interchangeably and pivotably support a material collection system or a sprayer attachment behind the engine with a lower support bar engaging a pair of rear facing hooks and a latch engaging an upper tube between the pair of side brackets.

5. The zero turning radius mower sprayer attachment of claim 4 wherein the lower support bar pivots on the rear facing hooks to move the latch into or out from an engagement position with the upper tube.

6. The zero turning radius mower sprayer attachment of claim 5 further comprising an L-pin moving inward to lock the latch in engagement with the upper tube.

7. The zero turning radius mower sprayer attachment of claim 6 further comprising a support frame including a platform for a tank.

8. A zero turning radius mower sprayer attachment, comprising:

a tank connected to a plurality of spray nozzles on a folding boom behind a rear engine of a zero turning radius mower;

a side bracket on each side of the rear mounted engine and extending rearwardly and downwardly adjacent the engine;

a support frame pivotably mounted to the side brackets for the folding boom and a platform under the tank; and a hook shaped latch that releasably engages the support frame to the side brackets of the zero turning radius mower.

9. The zero turning radius mower sprayer attachment of claim 8 further comprising an upper tube between the pair of side brackets that is releasably engaged by the hook shaped latch.

10. The zero turning radius mower sprayer attachment of claim 9 further comprising a hand cart carrying the support frame when the support frame is off the side brackets of the zero turning radius mower.

* * * * *